United States Patent [11] 3,555,195

[72] Inventors James C. Rester;
Curtis D. Brudos, Northridge, Calif.
[21] Appl. No. 673,076
[22] Filed Oct. 5, 1967
[45] Patented Jan. 12, 1971
[73] Assignee RCA Corporation
a corporation of Delaware

[54] MULTIPLEX SYNCHRONIZING CIRCUIT
5 Claims, 5 Drawing Figs.

[52] U.S. Cl. .......... 179/15, 178/69.5
[51] Int. Cl. .......... H04j 3/06
[50] Field of Search .......... 179/15SIG, 15SYNC, 15ASYNC; 178/69.5(Inquired); 325/38.1

[56] References Cited
UNITED STATES PATENTS 3,241,067 3/1966 James .......... 178/69.5X
3,436,480 4/1969 Pan .......... 178/69.5

*Primary Examiner*—Ralph D. Blakeslee
*Attorney*—Edward J. Norton

ABSTRACT: There is disclosed a synchronizing circuit which automatically selects the proper phasing alignment when demultiplexing a digital data stream. The data stream is generated by the time multiplexing of two or more modulated channels. The data stream is demultiplexed in a specified format at a receiver and one demultiplexed channel is coupled to a synchronizing circuit. The synchronizing circuit detects a pattern which is known to be forbidden due to certain properties of the modulation technique or the original analogue signal and hence can occur only if synchronization is lost. A counter controlling an input gate determines the time the data stream is sampled and by means of a decoding circuit can detect the forbidden pattern. The detection of this pattern causes the input signal to be shifted in phase by the action of the synchronizing circuit until the reception of proper signals is accomplished.

INVENTORS
JAMES C. RESTER
CURTIS D. BRUDOS
BY Edward J. Norton
ATTORNEY

INVENTORS
JAMES C. RESTER
CURTIS D. BRUDOS
BY Edward J. Norton
ATTORNEY

INVENTORS
JAMES C. RESTER
CURTIS D. BRUDOS
BY Edward J Norton
ATTORNEY

MULTIPLEX SYNCHRONIZING CIRCUIT

BACKGROUND OF INVENTION

Digital modulation and multiplexing techniques are becoming increasingly important in modern communication systems. Such techniques use PCM (pulse code modulation), delta modulation, PAM (Pulse amplitude modulation) and various other types of digital techniques, where the amplitude of an analogue signal is represented by a digital code or by a digital level such as binary one or binary zero. In any case when transmitting such codes one must be assured that the transmitter and receiver are in synchronism. This is especially true when one multiplexes such signals; as in such systems messages or data from various separate channels are coalesced and transmitted by a single channel. The receiver therefore has to demultiplex these signals in proper groups and hence to do so it has to be synchronized to the transmitter. The synchronizing process, then, requires that the apparatus at opposite ends of the transmission medium not only be kept in step with respect to code groups and digit spaces within the code group, but also with respect to frames of code groups and hence the term framing is used. When the transmitter and receiver are properly synchronized they are described as being in frame. When they are not properly synchronized, they are referred to as being out of frame. The prior art has been concerned with the proper framing of such signals.

Several methods have been proposed for synchronization in such time division multiplex systems employing code modulation techniques such as PCM or delta modulation. One particular system which has been used employs a predetermined sync pattern which appears in successive frames. In this manner the demultiplexed signal is scanned on a channel basis until a channel which contains the sync pattern is found. The data is now synchronized according to the information in this channel. In the above system, when that pattern which is the sync pattern appears, the scanning apparatus remains at that channel until the incoming signal pattern is identified to be different from the sync pattern and the equipment then shifts to the next channel to perform the same function. The operation is repeated continuously and can require a relatively long time to obtain proper synchronization. Still another system employs a separate sync time slot containing a predetermined pattern of several bits which represents the sync pattern. This pattern is detected at the receiving end by means of a shift register. This system is suitable to pulse code modulation but is not necessarily economical for other modulation systems. In still other systems a separate channel which is known to contain a predetermined synchronization signal is reserved. The contents of this channel then determines the amount of shift necessary to the other channels by determining the direction and amount the synchronization channel is shifted or corrected to obtain the correct signal pattern.

It is therefore an object of the present invention to provide a synchronization circuit for time multiplexed digital code modulated signals which eliminates the need for a separate synchronization channel.

A further object is to provide a synchronization circuit which automatically selects the proper phasing alignment when demultiplexing a time multiplex digital signal.

It is still a further object to provide an improved synchronization circuit which requires no special synchronization signal from the transmitter.

A further object is to provide an improved synchronization circuit which automatically synchronizes a time division multiplex signal by using certain known properties of the modulation technique or of the original analogue signal.

BRIEF DESCRIPTION

A digital data stream is generated at the transmitter by the time multiplexing of two or more digital modulated signals. The limits of the signals as far as frequency content and amplitude variation are known and the limitations or output capability of the modulator is known. In such an arrangement of signals a pattern can exist which represents an improper amplitude or frequency characteristic of the known signal. The receiver demultiplexes the digital data stream into two or more data streams which correspond to the information in two or more channels originally transmitted. A synchronization circuit is coupled to one of the data streams in which the occurrence of a forbidden pattern is most probable. This channel signal is applied to a gating circuit at the input of the synchronization circuit. If the channel is properly aligned the pattern at the output of the gating circuit will be correct and therefore in synchronization. However, if the output of the gating circuit is not correct, then the forbidden pattern is detected by means of a comparison circuit whose output is coupled back to one input of this gating circuit and which can inhibit the gating circuit according to whether or not the forbidden pattern is detected. The comparison circuit then samples the input signal and stores the input level in response to a counter which is clocked according to a predetermined bit rate. The counter is controlled so that it can delay the output of the gating circuit by at least one bit time. After such a delay the synchronizing circuit again looks at the signal to determine whether the forbidden pattern still exists. If it does, the process is repeated until the patterns generated are within the above described criteria. If not, the process is repeated until the patterns are correct and hence the circuit is in synchronism.

DETAILED DESCRIPTION

Figure 1:
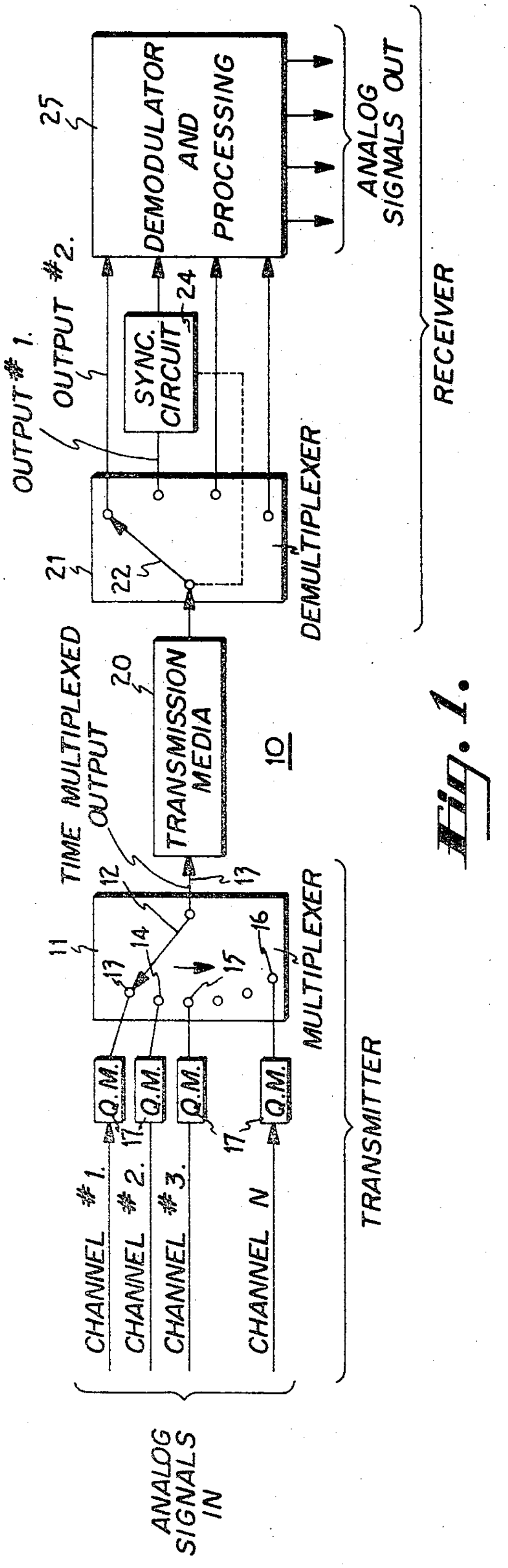
FIG. 1 is a block diagram of a communication system which may be employed with this invention.

If reference is made to FIG. 1 there is shown a communications system 10 employing a code modulation technique in conjunction with time division multiplexing. Numeral 11 refers to a multiplexing unit which scans a plurality of analogue channels shown on the left as channel 1 to channel N. The analogue signals present at the respective channels contain different information or data. Each analogue channel is coupled to a quantizing modulator 17 or Q.M. 17 to provide at its output a digital modulated signal representative of the analogue signal. Each quantizing modulator 17 converts the analogue channel signal to a digital coded signal or to digital information. If PCM is used, the amplitude of the analogue signal is represented by a digital code at each sampling pulse. The output of each quantizing modulator 17 contains a digitally coded signal wherein the analogue signal at each input channel is digitally represented. The multiplexer 11 serves to scan each modulator 17 at a suitable repetition rate which is determined by the maximum expected frequency content of the analogue signal. Each channel is therefore sampled at a relatively high rate and combined into a coalesced signal at the output of the multiplexer 11. For clarity, the multiplexer 11 is shown as a switch having a rotatable or moveable arm 12, and a series of contacts 13 through 16 to each of which a separate one of the analogue channels after being quantized by the modulator 17 is coupled. The combined multiplexed signal AND output of the multiplexer 11 on lead 13. Therefore lead 13 contains a signal having digital coded information content representative of each analogue channel during a respective time slot. The switching arrangement shown for the multiplexer 11 is merely representative of the function of the device and in practice one may use a counter with decoding gates, a shift register or a ring counter or some other suitable type of scanning apparatus capable of sequentially or pattern scanning or sampling a plurality of channels. Such scanning and multiplexing techniques are known to those skilled in the art. It is noted that the multiplexer 11 does not have to scan or look at the signals in a sequential order and many do so in any desired format. That is, the multiplexer 11 may be programmed to first sample channel 1 and AND and then channel N and then channel 2, and so on. Many combinations and permutations are possible using known logic techniques. The output 13 of the multiplexer 11 then contains a known data format where the amplitude of each analogue channel signal is represented by a digital code located in a time slot selected by the multiplexing pattern.

For a clearer understanding of the nature of the invention, assume that it is desired to multiplex and quantize a color video signal using a delta modulator for each of the modulators 17. For convenience assume analogue channel 1 contains information pertinent to the luminance of the color video signal, which corresponds to the video signal in a monochrome television system. The luminance signal is referred to in the art as the Y signal. Channel 2 contains the I signal and Channel N contains the Q signal, and hence I and Q signals are the so-called AND color difference signals in a color television system and as such carry no information regarding the brightness of the picture. For a clearer understanding of how these AND gate and used in the art see "Electronic and Radio Engineering" by Frederick E. Terman, 4th Edition, McGraw Hill, (1955), pages 999—1003. The Y, I and Q signals are then delta modulated by means of the respective Q.M. 17 and combined in a desired manner by the multiplexer 11 which provides a coalesced single signal at the output lead 13. For examples of suitable delta modulators which can be used for modulators 17 see for example "Single BIt Delta Modulating Systems" by A. Lender and M. Kozuck, Electronics, Nov. 7, 1961, pages 125—129, "Delta Modulation for Cheap and Simple Telemetering" by F. K. Bowers, 1959, IRE Wescon Convention Report, part 5, Aug. 1959, pages 63—67.

Basically in a delta modulation system to obtain analogue digital quantizing, the analogue signal is compared to a reconstructed signal, in this case a video signal is compared to a reconstructed signal, in this case a video signal, at each sample time. The difference between the reconstructed video signal and the original analogue signal is used to generate the digital data. If the difference is negative in simple 1-bit delta modulation a zero is sent and if the difference is positive a one is sent. Therefore a digital signal of consecutive ones represents an analogue signal whose amplitude is increasing at every sample time; and a digital signal of consecutive zeros represents an analogue signal whose amplitude is decreasing at every sample time. Since a known limit is placed on the amplitude of the analogue signal, the delta modulator 17 can be designed to take a maximum number of steps in representing the full amplitude swing of the analogue signal. For the case of a color video signal, 15 steps can accurately define each channel.

The coalesced output 13 of the multiplexer 11 is coupled to a transmission media 20, which may be broad band video lines, a microwave link or some other suitable transmission channel or media. At the other end of the transmission media 20, or in this case the receiving end, the signal has to be broken up into various separate channels which eventually represent each of the separate channels transmitted. Hence the coalesced signal after reception has to be demultiplexed by means of a demultiplexer 21. In order to preserve the channel information content and retrieve the actual signals in proper time the moveable arm 22 of the switch in the demultiplexer 21 has to be in synchronism with the switch 12 in the transmitter. One then has to be assured that the receiver is breaking down the multiplexed information signal in proper sequence; such that the Y, I and Q channels are recovered properly. The present invention utilizes a sync circuit 24 whose input is coupled to one of the demultiplexed data channels from the demultiplexer 21. The exact nature of the channel signal used and the operation of the sync circuit 24 will be described in detail subsequently. The sync circuit 24's function is to automatically select the proper phasing alignment when demultiplexing the digital data stream which was generated by the time multiplexing of two or more delta modulated signals, in this case the Y, I and Q signals. Sync circuit 24 of this invention requires no special synchronism signal from the transmitter and therefore its presence does not lower the data rate for a given transmission rate. In this manner, as will be shown, when the demultiplexing phasing alignment is incorrect the synchronism circuit 24 detects a pattern which is known to be forbidden by certain properties of the modulation technique or be certain properties of the original analogue signal. When an incorrect or forbidden pattern is detected the phasing alignment is moved by the action of the synchronizing circuit 24 and this process is repeated until no forbidden patterns are detected, in which case the phasing is assumed to be correct. The properly synchronized signals are then coupled to a demodulator and processor 25 where they are reconverted by a digital to analogue converter into the original analogue signals and coupled out on individual leads. By this technique the Y, I and Q signals are retrieved in proper orientation and amplitude.

Figure 2:
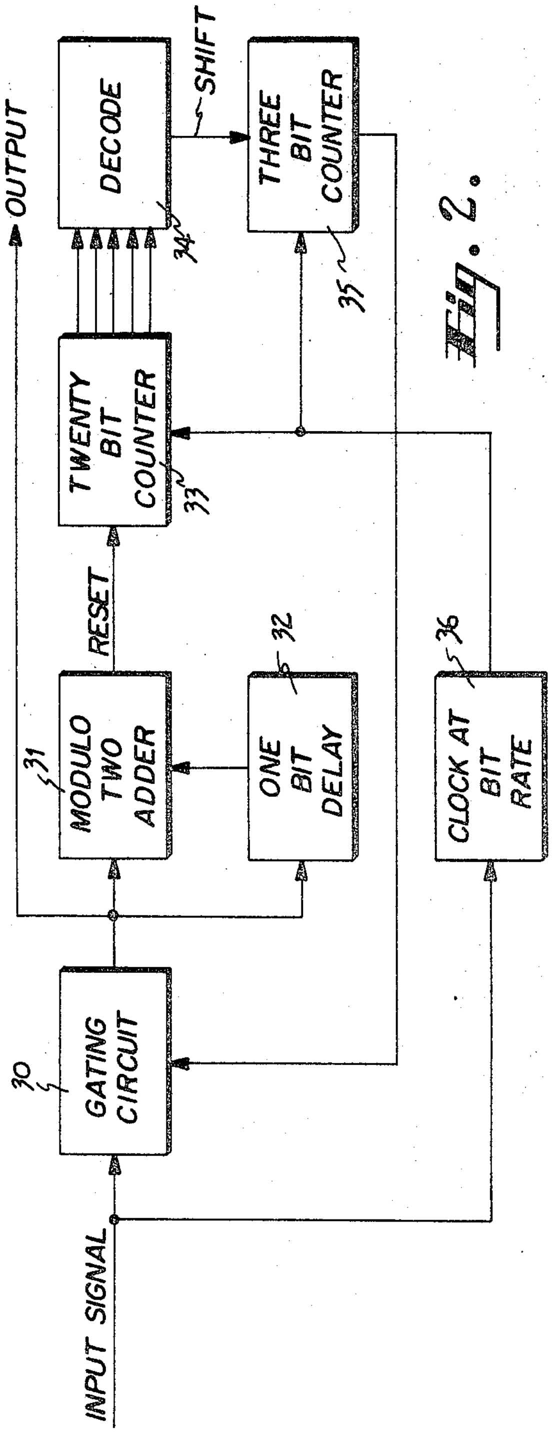
FIG. 2 is a block diagram of one embodiment of a synchronization circuit according to this invention.

If reference is made to FIG. 2 there is shown a circuit which can be used to separate the I and Q signals from the Y signal in a digital color television system. One of the data streams at the output of the demultiplexer 21 of FIG. 1 is coupled to one input of a gating input 30 which may be a typical AND gate known in the art and examples of which can be found in any conventional text on logic design. The output of the AND gate 30 is coupled to a modulo two adder 31 which may be a conventional binary adder without the carry function. For 20-bit of a suitable circuit see "Pulse and Digital Circuits" by Millman and Taub McGraw Hill, 1956, pages 419 to 422. The adder 31 is a device with two inputs and a single output which will provide the binary sum at the output for a binary signal at each input. The adder 31, for example, will provide a zero at its output for simultaneous ones or zeros at its inputs or the adder 31 will provide a one at its output for a zero at one input and a one at the other input. The output of the gating circuit 30 is coupled to a one bit delay circuit 32 which may be an RC network, a one shot or some other suitable delay circuit. The output of the delay circuit 32 is coupled to the other input of the modulo two adder 31. The output of the modulo two adder 31 is coupled to the reset lead of a twenty bit counter 33. The counter 33 may be a five-stage binary counter with suitable feedback to produce an output pulse for every 20 input pulses. Input pulses are supplied to the 20-bit counter 33 by means of the clock generator 36. Generator 36 may be a phase locked oscillator under control of the input signal and will therefore produce an output pulse for every bit of the input signal. Bit generators 36 are known in the art and not considered part of this invention. Examples of counting devices which can be utilized for counter 33 are also known in the art and reference is made to the above noted text, chapter 11 entitled "-Counting" pages 323 to 354. The appropriate stage outputs of the 20-bit counter 33 are coupled to decoding circuit 34 which may also be an AND gate capable of decoding a required count, in this case the count equivalent to the 20th state. The output of the decoding gate 34 is coupled to a 3-bit counter 35 which also may be a binary counter or some other suitable device capable of providing an output pulse for three input pulses. The output lead from the decode circuit 34 can inhibit or set the 3-bit counter 35 as will be explained. Input pulses are also supplied from the bit clock circuit 36 to the three bit counter 35. The output of the 3-bit counter 35 is coupled back to the other input of the gating circuit 30 to control its transmission or determine when it passes or inhibits the input signal. It is noted that the output of the gating circuit 30 is utilized as the system output and will, for example, contain the separated Q signal.

Figure 3:
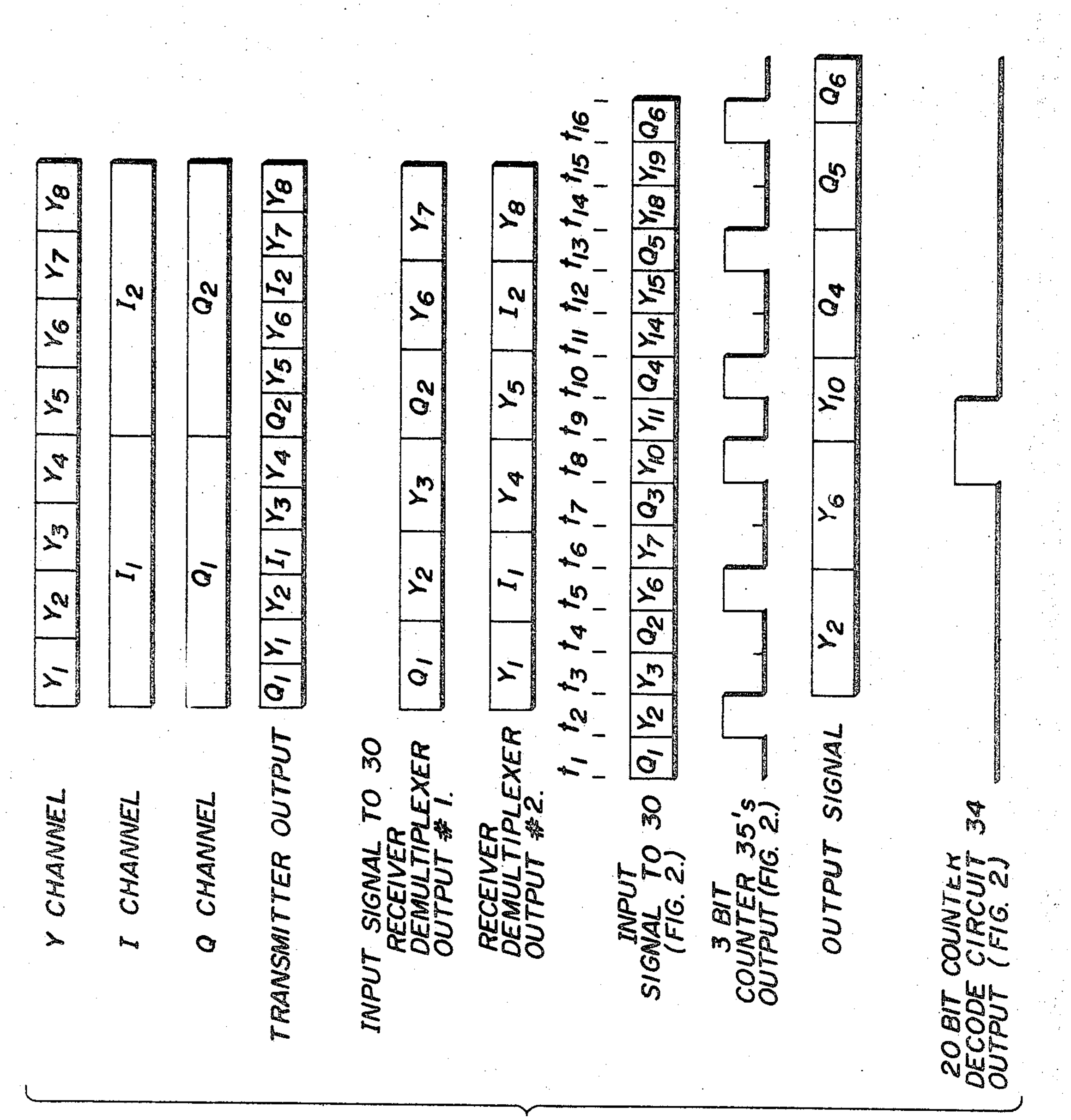
FIG. 3 is a series of representative waveform diagrams used in explaining the operation of the circuit of FIG. 2.

If reference is now made to the timing diagrams of FIG. 3 the operation of the circuit of FIG. 2 will be explained. As indicated previously the three channels of concern are the Y, I and Q channels which appear as shown in FIG. 3. It is noted that the bit rate of the Y signal is four times that of the I and Q signals. Hence bits $Y_1$ to $Y_4$ correspond in time to bit $I_1$ and $Q_1$ respectively. In the transmitter shown in FIG. 1 these signals are multiplexed together to produce the format shown in FIG. 3 designated as the transmitter's output. This signal shown in FIG. 3 is the signal as it would appear on lead 13 of FIG. 1 in the time format shown. Each modulator 17 of FIG. 1 is designed for a maximum number of steps to represent a full amplitude swing of the analogue signal. In the case of a digital delta modulated color television signal the necessary number of steps is assumed to be 15. Therefore a pattern of 20 consecutive ones or zeros is chosen to provide protection against transmission errors producing this forbidden pattern. If a legitimate signal of 15 consecutive ones is generated (representing a full positive swing of the analogue signal) then the next five bits of the digital data must contain a minimum of three zeros. Therefore a minimum of three incorrect bits must be introduced into this signal by transmission errors to provide a forbidden pattern. It would then take a minimum error of 3-bits out of 20 to cause a loss of synchronism.

At the receiver the transmitter's output signal is demultiplexed by means of the demultiplexer 21 of FIG. 1 into two output signals having the formats shown in FIG. 3 as receiver demultiplexer output number 1 and number 2. The signal containing the Q bits namely the receiver demultiplexer output number 1 diagram of FIG. 3 is the input signal shown coupled to one input of the gating circuit 30 of FIG. 2. The gate 30 is controlled, as indicated previously, by the 3-bit counter 35 to gate out every 3rd-bit of the input signal. If reference is made to FIG. 3 it is shown that this action will for example gate out the $Q_1$, $Q_2$ .....$Q_n$ bits as these bits appear in every third position, (Note that each Q bit is separated by two Y bits). If the recovered signal from the gating circuit 30 is actually the Q signal it cannot contain twenty consecutive ones or zeros because of the previously described restrictions placed on the delta demodulator 17 of FIG. 1. It is recalled that each modulator 17 has been designed for a maximum of 15 steps to represent the full amplitude swing of the analogue signal. If the gating circuit 30 is improperly aligned and for example is gating out only the bits of the Y signal the pattern of 20 consecutive ones or zeros has a much greater probability of occurring because of the more nearly random characteristics of the Y signal. This is so because the portion of the Y signal contained in the receiver demultiplexer output number 1 signal is not consecutive bits of the Y signal, $Y_2$, $Y_3$, $Y_4$, $Y_5$ and so on, but is as $Y_2$, $Y_3$, $Y_6$, $Y_7$ and so on. If the phasing is off by the maximum of 2-bits it can be shown that it takes two searches to recover the correct signal which is approximately 210 milliseconds or 6.3 frames of the television signal if operating at 30 frames per second.

Beneath the receiver demultiplexer output number 2 diagram of FIG. 3 there is shown a diagram for 16-bit slots. The input signal to the gate circuit 30 is also shown again beneath this timing diagram for 16-bit slots. Assume that the 3-bit counter 35 is being triggered by the bit rate clock generator 36 of FIG. 2 in a manner to enable gate 30 at the Y pulses as shown in the left-hand portion of the diagram labeled output signal. The output of the gating circuit 30 is coupled to the modulo two adder 31 which also receives at its other input a one bit delay pulse from the delay circuit 32. Hence at the inputs of the modulo 2 adder 31 there appears successive bits to be compared because the 1-bit delayed pulse represents the previous output from the gating circuit. If the output from the gating circuit and the output from the delay circuit are either both binary ones or both binary zeros, the modulo two adder 31 produces a zero at its output. This allows the 20-bit counter to continue to run. When the 20-bit counter 33 has completed its count (20 states) this is decoded by the decode gate 34 whose output goes high indicating then that the bits have been alike for 20 consecutive time slots. This action of the decode gate 34 then shifts the state of the 3-bit counter 35 by 1-bit time. This operation is shown in the diagrams of FIG. 3 by the output of the 20-bit counter decode circuit 34 going high at time $t_8$ causing the output of the 3-bit counter to go high at time $t_10$ instead of time $t_11$. Hence this action now enables the gating circuit 30 in proper sequence and thereafter the output signal as shown contains the Q bits in proper sequence. It is of course understood that once one data stream, in this case the Q bit stream, is obtained correctly and in proper sequence, as shown, all other streams and positions of the appropriate bits as the Y and I bits are known and defined as the original multiplexing format is known.

Figure 4:
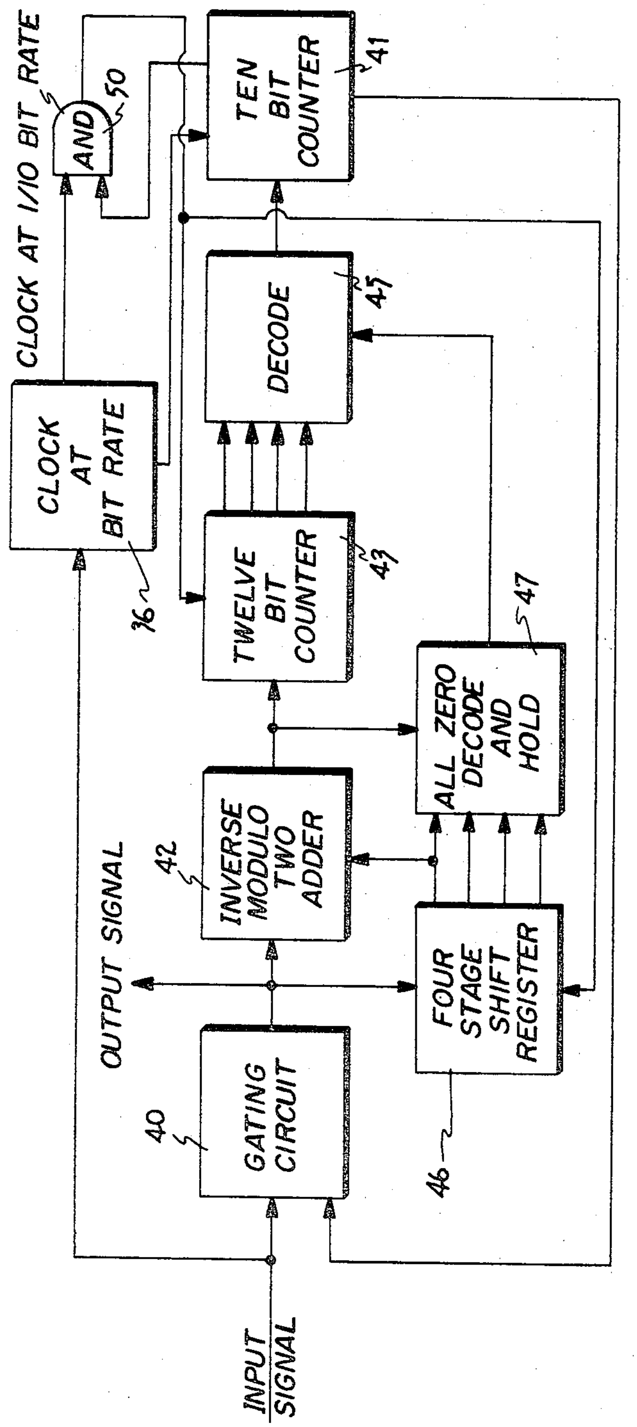
FIG. 4 is a block diagram of another embodiment of a synchronizing circuit according to this invention.
Figure 5:
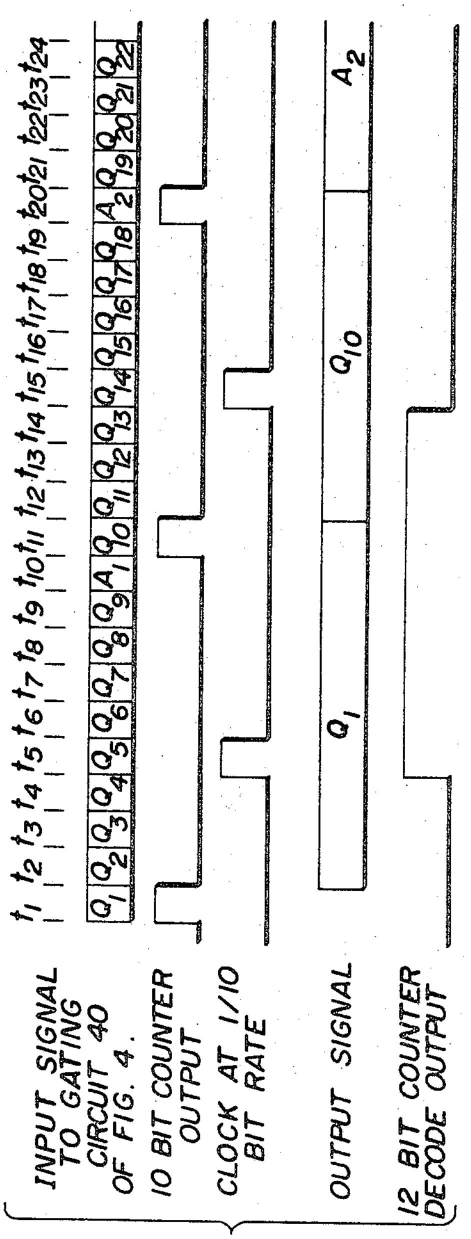
FIG. 5 is a series of representative waveform diagrams used in explaining the operation of FIG. 4.

The embodiment shown in FIG. 4 is used to separate the audio bits from the Q bits when multiplexed together with a Q signal having a bit rate nine times the bit rate of the audio signal. FIG. 4 shows a gating circuit 40 which also may be an AND gate. The input signal to be described which can be provided in the manner outlined in connection with FIG. 1 is applied to one input of the gating circuit 40. The other input of the gating circuit is under control of a ten bit counter 41. The output of the gating circuit 40 is coupled to the input of an inverse modulo two adder circuit 42. The output of the inverse modulo two adder circuit 42 is coupled to the reset lead of a 12-bit counter 43, which may be a binary counter, similar to the one used for counter 33 of FIG. 2, with proper feedback to obtain 12 discrete states for 12 input pulses. The 12-bit counter is triggered by means of a divided clock generator 50, which is an AND gate synchronized to the input signal and gated with an output of the 10-bit counter 41 to provide a clock -bit one-tenth of the input bit rate. The signal from the 10-bit counter 41 coupled to gate 50 is taken from another section of the binary type counter 41 to provide a delay with respect to the 10-bit counter's output coupled to gate 40. The signal is shown in FIG. 5 as clock at one-tenth bit rate. The twelfth state of the 12-bit counter 43 is decoded by means of a decode circuit 45 which can be an AND gate coupled to the appropriate stages of the counter to determine the 12th state. In this case because of the bit separation between the Q bits and the audio or A bits the decode circuit 45 controls the 10-bit counter 41 which is triggered at the actual clock bit rate by generator 36 and its output is shown in FIG. 5 as 10-bit counter output. The output of the 10-bit counter 41, as previously described, is coupled to the input of the gating circuit 40 to control its transmission.

In this case the output of the gating circuit 40 is also coupled to a four-stage shift register 46 which is shifted at one-tenth of the bit rate and hence has its shift input coupled to the AND gate or divided clock generator 50. The output of each stage of the shift register 46 is coupled to a decode gate 47 which is an AND gates and serves to decode and hold the all zero state of the shift register 46. The output of the decode gate 47 is coupled to one input of the decode circuit 45. There is also shown an output from the inverse modulo two adder 42 coupled to the all zero decode gate 47.

The operation of the circuit of FIG. 4 will now be described in conjunction with the representative waveform diagrams shown in FIG. 5. The circuit as indicated above in providing synchronization separates the audio bits a from the Q bits. FIG. 5 shows the input signal in relation to the bit timing diagram showing bit slots $t_1$ to $t_{24}$. Hence the input signal to the gating circuit 40 contains nine Q bits followed by an A bit followed again by nine Q bits followed by an A bit and so on. This signal is gated through the gating circuit 40 by means of the 10-bit counter 41 and if the gating circuit 40 is properly aligned the audio channel or the A bits will be recovered correctly. If the phasing is not correctly aligned then every 9th-bit of the Q channel will be recovered as $Q_1$ and $Q_{10}$ and so on. If the recovered signal is actually the audio signal it cannot contain the following patterns 111100001111 or 000011110000. This is so because if the bit rate of the digital signal representing the designated audio signal is, for example, 500 kilohertz per second the patterns above would represent a sine wave with a frequency of 500 divided by 8 or 62.5 kilohertz which is not possible for the audio signal as the audio signal will be limited to 15 kilohertz. However, if the recovered signal from the output of gate 40 is actually every 9th-bit of the Q signal it has more nearly random characteristics and the probability of this signal containing either of the two patterns indicated above is two to the 11th power and therefore it can be calculated that the probable time between such patterns using gated Q bits is approximately 4.1 milliseconds. If the gating circuit 40 is improperly aligned and one of the patterns is detected then the phase of the 10-bit counter 41 is shifted 1-bit time. If the phasing is off by the maximum of 9-bits it would take nine searches to recover the correct signal which is approximately 36.9 milliseconds or 1.1 frames of the television signal. The gating circuit 40 looks at the input signal each time the output of the 10-bit counter 41 is high as shown in FIG. 5. The output of the gating circuit 40 is applied to the 4-bit shift register 46 which is also shifted at one-tenth of the clock bit rate via gate 50 and serves to delay the output signal 4-bit times with reference to the clock at one-tenth the bit rate. Thus the output signal from the gating circuit 40 and the delayed Q bit signal which was gated into the register 46 to be compared with the output signal occur forty actual clock bit times apart or 4-bit times apart when referencing to the one-tenth clock rate. These two Q bits are applied to the inverse modulo two adder 42. The adder 42 then compares this new Q bit with the Q bit received 4-bit times prior, referenced to the clock at one-tenth the bit rate, and if they are alike a high signal is generated to reset the 12-bit counter. If these two Q bits compared are different the adder 42 allows the 12-bit counter 43 to continue running. For the present purposes it is assumed that the 11 previous comparisons of Q bits indicated different bits and hence the 12-bit counter is at its next to last count. Therefore the 12-bit counter 43 will be allowed to reach its last state and the counter decode circuit 45 will decode this condition to apply a high pulse to the 10-bit counter 41 only if the shift register 46 contained all zeros at any time while the 12-bit counter 43 was running. This condition will also be fulfilled, as described, as there is a great probability that the random comparing of the Q bits as Q1 with Q19 and so on, will produce the all zero pattern. This pattern is detected and stored by the decode and hold circuit 47 as long as the 12-bit counter 43 continues to run. The all zero decode and hold circuit 47 stores the fact that the four-stage register 46 contained all zeros while the 12-bit counter was running. The output of the inverse modulo two adder 42 is also coupled to the all zero decode and hold gate 47 to reset this state when the 12-bit counter is reset. The 12-bit counter 43 reaches a count of 11 which is the last count before the reset state and corresponds to the counting of 12-bits, for the following 16 patterns and hence the zero decode circuit 47 only generates a decode pulse for those patterns formed by the Q bits stored in register 46 containing 111100001111 or 000011110000. The 16 patterns which will allow the 12-bit counter to reach its last count are as follows:

1. 0000111100001111
2. 000111100001111
3. 001011010010110
4. 001111000011110
5. 010010110100101
6. 010110100101101
7. 011010010110100
8. 011110000111100
9. 100001111000011
10. 100101101001011
11. 101001011010010
12. 101101001011010
13. 110000111100001
14. 110100101101001
15. 111000011110000
16. 1111000011110000

Therefore when the 10-bit counter 41 receives a high pulse shift input from the 12-bit counter's decode circuit 45 the 10-bit counter's pattern is shifted 1-bit.

As represented in FIG. 5, when the gating circuit 40 passes the $Q_1$ bit at time $t_1$, the 12-bit counter is assumed to be in its 11th state, as all former Q bit comparisons indicated a difference of signal and the counter 43 was allowed to run. Also the all zero condition was decoded and held by gate 47 as probability indicates that at least one of the forbidden patterns of four consecutive zeros was present in register 46. Hence $Q_1$ is now compared with the Q bit that occurred 40-bit times prior with reference to the actual bit rate or 41-bit times prior with reference to the clock at one-tenth the bit rate. This comparison shows the bits to be different and therefore the 12-bit counter 43 is triggered to its last stage by the trigger generated by gate 50 at time $t_5$. This last state is decoded by decoder 45 which is also enabled by the all zero decode and hold circuit 47. The output of the 12-bit counter decode 45 is shown in FIG. 5 as lasting for 10 clock pulses $t_5$ to $t_{14}$. At $t_{15}$ the clock at one-tenth the bit rate from gate 50 again goes high and hence the 12-bit counter 43 is reset back to its starting state. The negative or trailing edge at the decode output gate 45 due to the transition causes the 10-bit counter 41 to go high at time $t_{20}$ instead of $t_{21}$. This is done by using the negative transition at the output of the decode gate 45 to add a count to the 10-bit counter. In this manner the next pulse that is passed by the gate 40 is the A2 pulse and thereafter the circuit operates synchronously only providing A pulses and hence the forbidden patterns as described above cannot occur for these audio pulses. If the circuit slips out of synchronism, Q bits will be coupled out of gate 40 again and the above described operation will again return the circuit to synchronism with the A or audio bits appearing at the output of the gate 40.

We claim:

1. Apparatus for synchronizing a time multiplexed digital signal, formed from a plurality of channel signals, said channel signals being generated by a modulator capable of producing a certain number of predetermined digital codes, such that each of said predetermined generated digital codes will become manifest in said multiplexed digital signal only when said digital codes are detected in a given channel sequence with respect to a specified standard, comprising;

a. means responsive to said multiplexed digital signal for demultiplexing said signal into a plurality of data streams, at least one of said streams containing information representative of at least two of said channel signals;

b. means responsive to said one of said data streams for providing a control signal indicative of the presence of another predetermined code not incorporated within said certain number of digital codes only in response to said predetermined digital codes being out of timing synchronism with respect to said specified standard; and c. means responsive to said control signal for shifting the phase of said one data stream until said certain number of predetermined digital codes are in timing synchronism with respect to said specified standard.

2. In combination:

a. a plurality of analogue channel signal sources;

b. means for generating a digitally coded multiplexed signal from said channel signals, said multiplexed signal having a given bit rate and a predetermined format;

c. means responsive to said multiplexed signal to demultiplex said signal into a plurality of individual signals, at least a chosen one of which contains data representative of at least two of said channel signals, said data representative of each channel further being separated by a given bit number;

d. means for delaying said chosen signal for a time selected in accordance with said given bit rate;

e. means for comparing said delayed signal with said chosen signal to provide a control signal represented by differences therebetween;

f. a counting circuit coupled to said comparing means and responsive to said control signal for providing an output each time said control signal does not appear for a given number of said bits; and g. means coupled to said counting circuit and responsive to said chosen signal for providing an alignment signal to shift the phase of said chosen signal in accordance with said counting circuit's output.

3. Apparatus for separating out in synchronism a digital data signal having a plurality of known predetermined patterns contained in a coalesced signal formed by the time multiplexing of at least two channel signals comprising:

a. means for demultiplexing said coalesced signal into a plurality of signals, one chosen one of which contains said digital data signal having bits thereof separated by a given fixed number of bits of another of said channels;
b. first means responsive to said chosen signal to extract from said signal a certain selected series of bits separated from one another by said given fixed number of bits, said series of bits forming a plurality of digital patterns any of which may or may not be some one known predetermined pattern;
c. second means coupled to said first means and responsive to said patterns to detect the occurrence of a pattern not one of said known predetermined patterns in said series for providing a shift signal upon said detection; and
d. control means coupled to said first means and responsive to said shift signal to select a different series of bits from said certain series, said different series of bits being separated from one another by the same given fixed number of bits.

4. A receiver for use in a digital multiplexed transmission system having predetermined constraints on the data signal which may be transmitted, said data signal having a given bit rate and formed by the coalescing of a plurality of analogue channels, wherein said receiver normally operates in synchronism with said transmitting comprising:

a. means for demultiplexing said data signal into a plurality of data signals, at least one chosen one of which has data information therein representative of at least two of said analogue signals, said data in said chosen signal representative of one channel separated from that of said other channel by a given number of bits;
b. coincidence means having an output and two inputs to one of which inputs is applied said chosen data signal;
c. means connected to said coincidence means other input to gate said coincidence means at a rate determined by said given number of bits, to produce a signal at said output consisting of only certain data from said chosen signal;
d. means coupled to said coincidence means output for delaying said certain data at least 1 bit time;
e. a comparator for comparing said delayed certain data with said certain data to provide a control signal indicative of differences therebetween;
f. means coupled to said comparator and responsive to said control signal for detecting a predetermined data format which is outside of said predetermined constraints; and
g. means coupled to said said gating means for said coincidence means and responsive to said detection of said predetermined data format for bringing said receiver back into synchronism with said transmitter.

5. Apparatus for synchronizing a time multiplexed digital signal having a given bit rate, said signal formed from a plurality of channel signals, said channel signals being generated by a modulator capable of producing a certain number of predetermined digital codes, such that each of said predetermined generated digital codes will become manifest in said multiplexed digital signal only when said digital codes are detected in a given channel sequence with respect to a specified standard, comprising:

a. means responsive to said multiplexed digital signal for demultiplexing said signal into a plurality of data streams, each of said streams containing information representative of at least two of said channel signals;
b. a clock generator responsive to said demultiplexed signals for producing a clock at said bit rate;
c. coincidence means having two inputs to one of which is applied one of said data streams;
d. first means coupled to said coincidence circuits' other input responsive to said clock to permit said coincidence means to provide at its output data included in said one data stream;
e. means coupled between said first means and said coincidence output means responsive to said output data for detecting a predetermined code not incorporated within said certain number of digital codes to provide a control signal to said first means to cause said coincidence means to provide output data only representative of a desired one of said channel signals included in said one data stream.

UNITED STATES PATENT OFFICE
CERTIFICATE OF CORRECTION

Patent No. 3,555,195 Dated January 12, 1971

Inventor(s) James G. Rester and Curtis D. Brudos

It is certified that error appears in the above-identified patent and that said Letters Patent are hereby corrected as shown below:

Column 2, line 69 correct "AND" to read --appears at the-

Column 3, line 7 correct "AND and" to read --then channe , and --.

Column 3, line 22 correct "and hence" to read --The--.

Column 3, line 23 correct "AND" to read --chrominance channels, or--.

Column 4, line 13 correct "be" to read --by--.

Column 4, line 28 correct "input" to second occurrence, should read -- circuit --.

Column 4, line 32 correct "20-bit" to read --an example--

Column 6, line 30 correct "bit" to read --at--.

Column 7, line 54 correct "0000111100001111" to read --000011110000111--.

Column 8, line 9 correct "41-bit" to read --4-bit--.

Column 9, line 33 correct "transmitting" to read --transmitter--.

Signed and sealed this 25th day of April 1972.

(SEAL)
Attest:

EDWARD M.FLETCHER,JR.
Attesting Officer

ROBERT GOTTSCHALK
Commissioner of Patents